United States Patent [19]

Jansen et al.

[11] 4,389,547
[45] Jun. 21, 1983

[54] TELEPHONE SET

[75] Inventors: Friedrich L. Jansen, Hilversum, Netherlands; Ian Phillips, Sherston Near Malmesloury, England

[73] Assignee: U.S. Philips Corporation, New York, N.Y.

[21] Appl. No.: 187,113

[22] Filed: Sep. 15, 1980

[30] Foreign Application Priority Data

Sep. 17, 1979 [GB] United Kingdom ................. 7932107

[51] Int. Cl.³ ............................................. H04M 1/00
[52] U.S. Cl. ................................. 179/81 R; 179/84 R
[58] Field of Search ............. 179/81 R, 84 R, 84 VF, 179/2 DP, 90 K

[56] References Cited

U.S. PATENT DOCUMENTS 3,517,137 6/1970 Ribner .............................. 179/81 R

*Primary Examiner*—Joseph A. Popek

*Attorney, Agent, or Firm*—Thomas A. Briody; William J. Streeter; Laurence A. Wright

[57] ABSTRACT

A telephone set comprising an input unit, a signal generating unit and an information processing unit, which may comprise a read-only memory, a microprocessor or a special LSI circuit for converting information supplied by the input unit into information to be transmitted. In order to obtain a greater reliability as a telephone set, a supervisory circuit, a switching unit and a d.c. isolated signal path have been provided between the switching unit and the information processing unit for coupling the input unit to the signal processing unit via the d.c. isolated signal path and for, possibly, coupling the signal processing unit to the signal generating unit when the supervisory circuit detects proper operation of the information processing unit and for connecting the input unit to the signal processing unit when the supervisory circuit detects a faulty operation of the said information processing unit.

6 Claims, 2 Drawing Figures

TELEPHONE SET

The invention relates to a telephone set comprising an input unit, a signal generating unit coupled to a first pair of wires of a subscriber's line and an information processing unit for transmitting information signals under the control of the input unit.

BACKGROUND OF THE INVENTION

Such a telephone set wherein the signal generating unit transmits signalling signals over a separate pair of wires which are isolated from the pair of wires used for the transmission of speech signals to a telephone exchange connected to the subscriber's line, is inter alia disclosed in the periodical Telesis FALL 1975, pp. 84–90.

The use of contemporary electronics in telephone exchanges and in telephone sets enables a rapid mutual exchange of information. Multi-frequency tone signalling can be used with great advantage because it permits a high signalling rate, up to 10 bits per second, and telephony systems are transparent for such signals.

For still higher signalling rates the information can be transmitted as data with a high bit rate of, for example, 150 bits/second. This rapid signalling, enabled by electronics, has the considerable advantage that an extensive set of services can be offered to the subscribers with a comparatively simple operation such as: reduced dialling, the fact that the subscriber's number can move with the subscriber when the subscriber moves permanently or temporarily to place where another telephone set is available, the automatic re-dialling of a subcriber whose set was busy etc.

These functions are performed by the information processing unit which, in its simplest form, comprises a read only memory but may comprise a micro-processor or a specially designed LSI-circuit in more sophisticated sets.

A serious problem is that the reliability is considerably smaller when a very large number of electronic components are introduced relative to telephone sets having simple multi-frequency tone signalling, which is exclusively used for the transmission of dialling signals. This fact has prohibited the introduction of such telephone sets in large numbers and for more extensive networks.

It is an object of the invention to obviate this drawback and to make the reliability of such a telephone set substantially equal to that of existing telephone sets or at least equal in performances.

SUMMARY OF THE INVENTION

The telephone set according to the invention is characterized in that it comprises a switching unit which is added to the input unit and the signal generating unit, and that the information processing unit is coupled to the switching unit via a d.c. isolated signal path, that the information processing unit comprises a supervising circuit for supervising the proper operation of the information processing unit and, possibly, further units d.c. coupled thereto, that the switching unit is arranged for coupling the input unit by means of the d.c. isolated signal path to the information processing unit under the control of the supervising circuit when the information processing unit properly and any further units d.c. connected thereto for converting information to be transmitted and that the switching unit is further arranged for connecting the input unit to the signal processing unit in the case of incorrect operation of the information processing unit and the possible, further unit connected thereto for transmitting the information supplied by the feed-in unit without converting the information.

This has the advantage that, should the information processing unit and/or a possible further d.c. units connected thereto operate incorrectly or fail the telephone set automatically operates as a conventional telephone set with multi-frequency tone signalling, so that on the one hand the reliability is substantially equal to that of existing telephone systems and, on the other hand, the transmission of faulty or incomplete information is prevented from ocurring.

In accordance with a further embodiment the telephone set is characterized in that the switching device is arranged to couple the information processing unit to the signal generating unit by means of the d.c. isolated signal path, under the control of the supervising circuit, for the transmission by the signal generating unit of the information which was converted in the information processing unit, when the information processing unit and any further d.c. units connected thereto operate properly.

This has the advantage that the telephone set is not only a four-wire set with speech signals, dialling tone and busy tone to be transmitted over a first pair of wires of the subscriber's line and signalling signals and/or data to be transmitted over a second pair of wires to a telephone exchange arranged therefor, but that it can also be a two-wire telephone set for transmitting said signals over a single pair of wires of the subscriber's line to a telephone exchange arranged therefor, the reliability of a conventional telephone set with multi-frequency tone signalling being retained.

BRIEF DESCRIPTION OF THE DRAWINGS

The invention and its advantages will now be further explained with reference to the embodiments shown in the drawings, (corresponding components have the same reference numerals in the drawings).

DETAILED DESCRIPTION OF THE PREFERRED EMBODIMENTS

Figure 1:
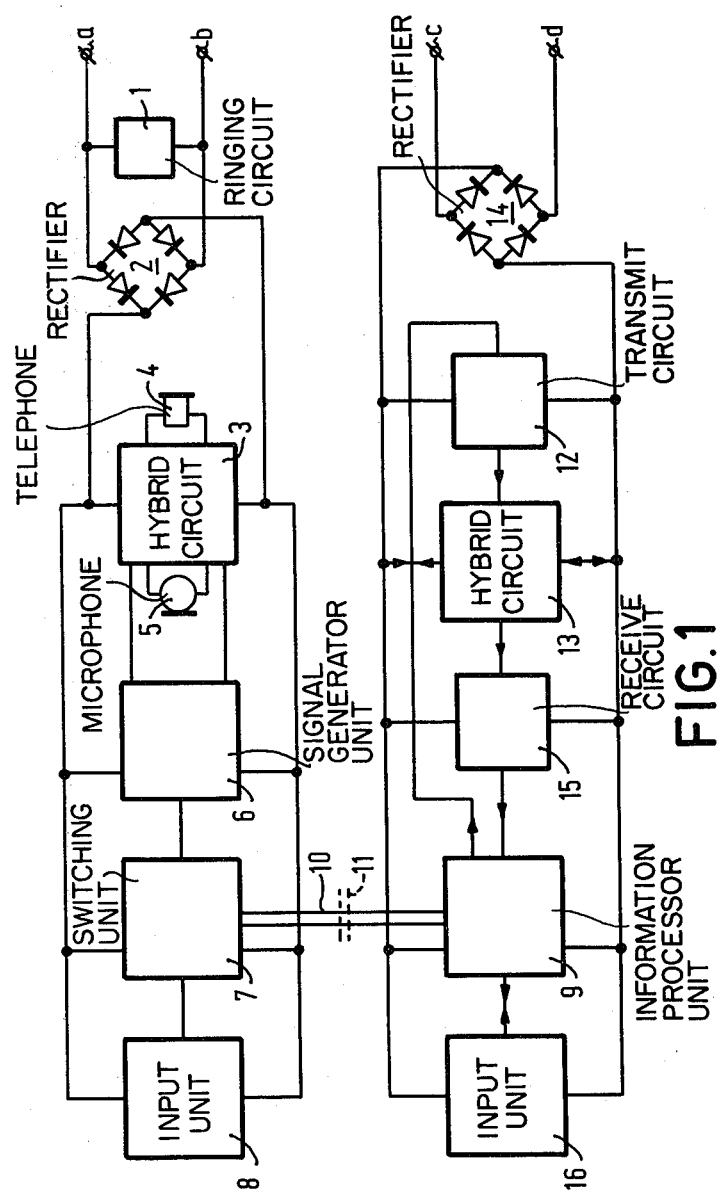
FIG. 1 shows a block diagram of an embodiment of a telephone set according to the invention.

The telephone set shown in FIG. 1 comprises a first pair of connecting terminals a and b for the connection of a first pair of wires of a subscriber's line. A ringing circuit 1 is connected to these connecting terminals a and b and, via a rectifier circuit 2, a hybrid 3 having connected thereto a loudspeaker 4, a microphone 5 and a signal generating unit 6, such as a multi-frequency tone generator, a input unit 8, such as a keyboard. These devices and units are fed via the connecting terminals. Furthermore, the ringing signal, the dial tone, the speech signals and the busy tone are received via these connecting terminals and speech signals and, possibly, signalling are transmitted via these terminals, which will be further explained hereinafter.

In order to increase the set of services of such a telephone set, the set comprises an information processing unit 9 which is coupled, via a signal path 10, to a switching unit 7 disposed between the input unit and the signal generating unit 6.

The information processing unit 9 has for its most important function the conversion of the input data supplied by the input unit 8 into information to be transmitted. When the telephone set is connected to a telephone exchange which comprises a multi-frequency tone receiver, which is coupled to a processor and connected to the a and b wires of the subscriber's line, the processor being arranged for processing information signals such as number routing etc., the information signals required therefor can be called up by means of the input data fed into the information processing unit 9 by means of the input unit 8 and these information signals can be applied to the signal generating unit 6 via the signal path 10 and the switching unit 7. This unit 6 converts the information signals into multi-frequency tone signals which are transmitted to the exchange via the hybrid 3, the rectifier circuit 2 and the connecting terminals a and b. Provided the control of the telephone exchange is arranged suitably for the purpose reduced dialling can, for example, be effected by means of the information processing unit 9.

For the processing of the input data into information signals to be transmitted, the information processing unit may be provided with a store in which the information signals are stored and whose addressing is effected by the input data so that this information can be called up in a simple manner.

When the telephone set is connected to a more sophisticated telephone exchange which has a separate signal path for signalling and/or data in addition to a signal path for speech signals, the telephone set can be conplemented with a separate signalling and/or data processing unit and the telephone set is connected to the exchange via a second pair of connecting terminals c and d and a second pair of wires of the subscriber's line.

The information signals generated in the information processing unit 9 are then applied to the connecting terminals c and d via an additional transmit circuit 12, a second hybrid 13 and a second rectifier circuit 14. The set may further be of any implementation suitable for causing signalling and/or data signals to be applied thereto by the telephone exchange. Signalling and/or data signals received at the connecting terminals c and d are then applied to the information processing unit 9 via the rectifier circuit 14, the hybrid 13 and a receive circuit 15. For the processing of this more rapid and more complicated information the signal processing unit 9 may comprise a micro-processor or a special LSI circuit. Such a signalling and/or data path, which is isolated from the speech signals, this path also being connected to the exchange when the telephone receiver is on its cradle, offers numerous possibilities. One of these possibilities is, for example, an additional input unit in the form of a keyboard or a card reader and a printer, which are all represented by the block 16 connected to the information processing unit 9. All the units provided for signalling or data processing are fed by the exchange via the second pair of wires and the terminals c, d. When the power required is too great an internal power supply can be connected.

Extending the telephone set with the above-mentioned electronic circuits has increased the number of applications and services of the telephone set and has simplified the operation. However, the reliability of such a set is less, owing to the great quantity of electronic components. In order to make the reliability substantially equal to that of a conventional telephone set, the set comprises means which render it possible to use the telephone set as a conventional set in the case of failure of these components.

Figure 2:
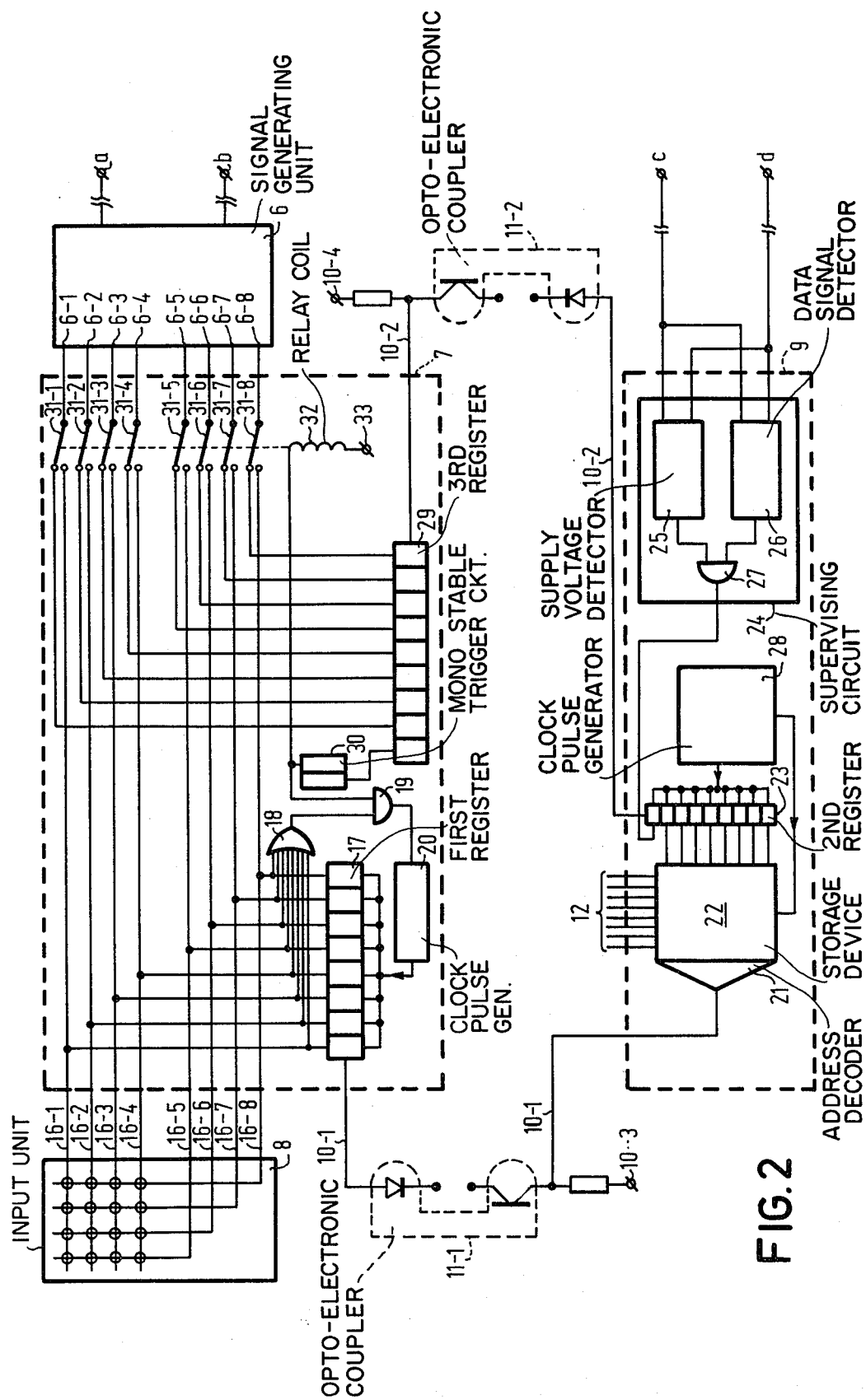
FIG. 2 shows a more detailed embodiment of the switching unit, the d.c. isolated path and the information processing unit of the telephone set shown in FIG. 1.

This will be further explained with reference to FIG. 2.

In this Figure the input unit 8, the switching unit 7, the signal processing unit 6, the signal path 10 comprise a coupling element 11 for the d.c. isolation of the speech signal section and the signalling or data processing section, and the information processing unit 9.

The input unit 8 is in the form of a keyboard having pushbuttons arranged in four rows and in four columns. When a button is depressed voltages are applied in known manner to the conductors which are coupled to this push button, the conductors being shown in the horizontal and the vertical direction in the drawing. These conductors 16-1 to 16-8, inclusive, which constitute the outputs of the input unit are connected to a register 17 in the switching unit 7. This register 17 has for its function to convert the voltage signals which are applied in parallel form by input unit 8, into a sequence of pulses, which are serially released. To that end a second clock pulse generator 20 is connected to clock pulse inputs of the sections of register 17 via an OR-gate circuit 18 and the AND-gate circuit 19.

As soon as one of the conductors 16-1 to 16-8, inclusive, carries a voltage in response to the depression of a button this voltage is applied to an input of the AND-gate circuit 19 via the OR-gate circuit 18. AND-gate circuit 19 allows this signal to pass in dependence on whether a condition signal is present at its other input, which will be further explained hereinafter. This voltage signal starts a counter, not shown, in the clock pulse generator 20, a number of shift pulses which correspond to the number of sections of the shift register being applied to the register 17 by means of this counter. Under the control of these shift pulses the content of the register is applied in the form of a pulse train to the first wire 10-1, which is connected to the output of the register 17, of the signal path 10.

This wire includes an opto-electronic coupler 11-1 as the d.c. isolating element, connecting point 10-3 being connected to the power supply of the c-d circuit. However, any other type of d.c. isolation can be used, such as a magnetic isolation etc. Thereafter the pulse train is applied to the information processing unit 9, namely to a storage device 22 having address decoder 21, for the sake of simplicity in this embodiment. However, other signal converting or processing units can be used instead of a storage device, such as a microprocessor or a specially designed LSI-circuit. Herein the pulse train applied to the address decoder 21 is decoded and applied to the storage device 22 wherein the information associated with the address is read.

Depending on the construction, whether it is a four or a two-wire set, the information is applied directly to the trasmit circuit 12 or to a second register 23. When the information is applied to the transmit circuit 12, it is applied to the second pair of connecting terminals c-d via the hybrid 13 and the rectifier circuit 14. Conversely, the information received at the connecting terminals c and d is applied via the hybrid 13 and the receive circuit 15, for example an amplifier, to a circuit, not shown, of the information processing unit and further processed there for the control of, for example, a display.

A supervising circuit 24 has been provided to make the reliability of such a telephone set substantially equal to that of a conventional multi-frequency telephone set, the services rendered being at least equal. This supervising circuit 24 continuously checks the proper operation of the information processing unit 9 and the units 12 to 16, inclusive, of the c-d circuit d.c. connected thereto. To that end the supervising circuit 24 comprises a supply voltage detector 25 and/or a data signal detector 26 which, as shown in the Figures, are both coupled in the case of a four-wire set to the second pair of connecting terminals c-d, and to supply lines and the signal output of the processing unit 9, respectively, in the case of a two-wire set. The supply voltage detector 25 may, for example, comprise a voltage divider connected between the wires and a transistor, the tapping point of the voltage divider being connected to the base of the transistor and the voltage of the tapping point being chosen equal to the base-emitter voltage of the transistor in the presence of the minimally required value of the supply voltage across the circuits of the c-d circuits. The required supply voltages being present, the transistor will be conductive and will be cutoff at a somewhat lower voltage. The voltage across a resistor which is included in the emitter circuit of the transistor is applied to an AND-gate circuit 27 as an indication signal.

The data signal detector detects, for example, whether the received and transmitted data, respectively, satisfy a predetermined criterion, for example whether not more than two out of eight bits of an information word are high. If this requirement is satisifed a high signal is delivered. The signal output of the data detector is connected to a second input of the AND-gate circuit 27.

The AND-gate circuit is connected to a scanning device, in the embodiment a first stage of the register 23. Only when both detectors 25 and 26 supply a high signal the output signal, denoted supervising signal hereinafter, is high, and the first stage of register 23 is set, in all other cases the first stage is in the reset condition.

It should be noted that, if only one detector is used, the AND-gate 27 can be omitted, which will be apparent from the above description.

A first clock pulse generator 28 is connected to the storage device 22 and to the stages of the register 23. Every 10 milliseconds, for example, the information word indicated by the address decoder 21 is read from the store under the control of this clock pulse generator 22 and written into the register 23, whereafter the content of the register 23 is applied serially to the second wire of the signal path 10-2 under the control of a counter in the clock pulse generator 28. The maximum position of the counter is then equal to the number of stages of the register, namely the number of bits of the information word increased with the supervising signal bit. It should be noted that, when the information of the storage device 22 is applied to the transmit circuit 12 for the case of a four-wire set, a low signal is applied to all stages, the first stage of the register 23 excepted, under the control of the clock pulse generator 28, in response to which these stages remain in the reset condition, to which these stages have been adjusted when the previous information was removed from the shift register by the clock pulse generator 28. The same applies when no information is called from the storage device by the input unit 8. The bit stream supplied by the register 23 is applied to a third register 29, in the switching unit 7 via a second opto-electronic coupler included in the second wire of the signal path and whose connecting terminal 10-4 is connected to the supply voltage of the a-b circuit.

Connected to the first stage of this register is a time measuring circuit, for example a monostable trigger circuit 30, and connected to the remaining stages are first contacts of bipolar change-over switches 31-1 to 31-8, inclusive, second contacts of which are connected to the conductors 16-1 to 16-8, inclusive, of the input unit 8 and the switching arms of which are connected to inputs 6-1 to 6-8, respectively, of the signal generating unit 6. The supervisory bit written in the first stage of register 29 will adjust the monostable element 30 to the set condition when this bit is high.

The monostable element controls by means of its signal output a relay coil 32, the end 33 of which is connected to the supply of the c-d circuit and also controls the AND-gate circuit 19.

For the time the monostable element 30 is in the set condition the condition signal is applied to the AND-gate circuit 19 in response to which it allows a signal coming from the OR-gate 18 to pass and the relay coil 32 is energized, the change-over switches 31-1 to 31-8, inclusive, being in the position shown in the drawing.

The information bits present in the register 29 are then applied to the inputs 6-1 to 6-8, inclusive, of the signal generating unit 6.

In the event of a two-wire set and if information is requested by the input unit two of the eight bits of each information word are high, these bits being transmitted by the signal generating unit as twice one out of four signals of the tone frequencies.

If no information is requested or in the event of a four-wire set, all bits of the information word are low, so that no signals of tone frequency are transmitted via the a and b conductors.

When no high supervisory signal bit is forthcoming for a period of time longer than the reset time of flipflop 30, for example 15 milliseconds, as in the case of a failure of the supply voltage in the c-d circuit or when faulty data are received or transmitted during said period of time the AND-gate circuit 19 becomes non-conductive in response to the fact the monostable flipflop 30 is reset and the change-over switches 31-1 to 31-8, inclusive, are adjusted to the position not shown in the drawing because of the fact coil 32 is not energized.

As a result thereof the voltage signals supplied by the input unit 8 are no longer read from register 17, so that no instructions are applied to the information processing unit 9 and these signals are directly applied to the signal generating unit 6 for their release at the connecting terminals a and b as twice one out of four signals of the tone frequencies.

The telephone set then reverts to the functions as present in a conventional multi-frequency telephone set, so that it has substantially the same degree of reliability and at least the same functions.

As the supervision has a so-called "fail-safe" construction, the functions of a normal multi-tone frequency telephone set are maintained even when the supervisory circuit 24 or the opto-electronic coupler 11-2, the signal path 10-2 or the coil 32 do not function anymore.

It should further be noted that the change-over switches 31-1 to 31-6, inclusive, can also be realized by means of logic AND and OR-gate circuits, the monostable trigger circuit 30 being directly connected to inhibitor terminals of this logic circuit.

What is claimed is:

1. A telephone set comprising:
   an input unit,
   a signal generating unit coupled to a first pair of connecting terminals for connection to a first pair of wires of a subscriber's line,
   an information processing unit under the control of said input unit for processing information signals from said input unit for use in said signal generating unit, and
   a switching unit which is connected to said input unit and said signal generating unit for receiving information signals from said input unit and said information processing unit,
   said information processing unit comprising a supervisory circuit for supervising the operation of said information processing unit, said switching unit coupling said input unit to said information processing unit under the control of said supervisory circuit when said information processing unit operates to convert information to be transmitted, said switching unit coupling said input unit to said signal generating unit when said information processing unit fails to transmit the information signals supplied by said input unit.

2. A telephone set as claimed in claim 1, wherein said supervisory circuit comprises a voltage detector for supervising the supply voltage of said information processing unit.

3. A telephone set as claimed in claim 1, wherein said supervisory circuit further comprises a data detector for detecting the correctness of the transmitted and received data.

4. A telephone set as claimed in claim 1, wherein said supervisory circuit delivers a supervisory signal indicating proper operation of said information processing unit,
   said information processing unit further comprising a scanning device and a first clock pulse generator, said scanning device being controlled by said first clock pulse generator for periodically scanning the supervisory signal,
   said switching unit comprising a time measuring circuit to which the scanned values of the supervisory signal are applied and further comprising switches the control inputs of which are connected to said time measuring circuit for connecting said input unit to said signal generating unit under the control of said time measuring circuit when the supervisory signal is not forthcoming for a period of time which exceeds the duration of at least one scanning operation.

5. A telephone set as claimed in claim 4, wherein said switching unit further comprises a first register the output of which is connected to a first d.c. isolated signal path circuit and stages of which are connected to respective outputs of said input unit,
   a second clock pulse generator connected to clock pulse inputs of the stages of said first register, the outputs of said input unit being coupled to the input of said second clock pulse generator by means of an OR-gate circuit for serially applying the information stored in said first register to said first d.c. isolated signal path circuit at the occurrence of a signal supplied by said input unit.

6. A telephone set as claimed in claim 5, wherein said information processing unit further comprises:
   a second register in which the information supplied by said input unit is written,
   said second register comprises an additional stage forming said scanning device and connected to said supervisory circuit,
   said first clock pulse generator being connected to all stages of said second register for periodically and serially having the content of said second register applied to a second d.c. isolated signal path circuit,
   said switching unit comprises a third register connected to said second d.c. isolated signal path circuit for writing information signals supplied by said second register, and said supervisory signal into said third register,
   said telephone set further comprising change-over switches whose switching arms are connected to inputs of said signal generating unit, the first contacts of said change-over switches being connected to those stages of said third register in which the information signals have been stored, and the second contacts of said change-over switches being connected to the outputs of said input unit, and said time-measuring circuit being connected to that stage of said third register in which the supervisory signal has been stored for applying the information signals stored in said third register to the inputs of said signal generating unit in the presence of a supervisory signal in said third register.

* * * * *